United States Patent [19]

Chocholaty

[11] 3,955,203

[45] May 4, 1976

[54] HIGH VOLTAGE DEFLECTION ELECTRODE APPARATUS FOR INK JET

[75] Inventor: Warren L. Chocholaty, San Jose, Calif.

[73] Assignee: International Business Machines Corporation, Armonk, N.Y.

[22] Filed: Jan. 24, 1975

[21] Appl. No.: 543,851

[52] U.S. Cl. .................................................. 346/75

[51] Int. Cl.² .......................................... G01D 15/78

[58] Field of Search .............. 346/75, 140; 118/620, 118/639, 637, 628; 317/3

[56] References Cited

UNITED STATES PATENTS

| | | | |
|---|---|---|---|
| 3,373,437 | 3/1968 | Sweet et al. | 346/75 |
| 3,701,998 | 10/1972 | Matais | 346/75 |

*Primary Examiner*—Joseph W. Hartary
*Attorney, Agent, or Firm*—John H. Holcombe

[57] ABSTRACT

Vacuum cleaned high voltage deflection electrode apparatus may be utilized in conjunction with further deflection electrode means to establish an electrostatic deflection field for ink jet. The high voltage electrode includes a pair of parallel planar fine screens interposed between two rows of ink jet stream paths and has a vacuum between the screens. Two separate rows of ink jet orifices may cause two rows of ink jet streams to be formed which pass through two corresponding rows of charging electrodes to selectively charge the drops upon breakoff. The drops pass on opposite sides of the high voltage electrode through the deflection field which deflects the charged drops and not the uncharged drop for selectively impacting a gutter or for recording. Significant ink mist may be generated and may come into proximity to the high voltage electrode which is then drawn through the screens by the vacuum to prevent mist accumulation on the electrode.

9 Claims, 5 Drawing Figures

HIGH VOLTAGE DEFLECTION ELECTRODE APPARATUS FOR INK JET

BACKGROUND OF THE INVENTION

The invention is of primary advantage when applied to the field of ink jet recording of the type similar to that shown in Sweet et al U.S. Pat. No. 3,373,437 where pressurized electrically conductive fluid is ejected from one or more rows of orifices for breaking into streams of uniform drops. As each drop breaks off from its fluid filament as ejected from the corresponding orifice, it may be selectively charged by an associated charge electrode. The charge electrodes are thus arranged in rows corresponding to and spaced from the rows of orifices so that the fluid streams may pass therethrough. The drops then pass through an electrostatic deflection field and each drop is deflected a distance which is related to the magnitude of the drop charge. As an example, the drops may be charged binarily so that the uncharged drops are undeflected and continue past the deflection field to impact a recording medium for printing while the charged drops are deflected to a drop catcher or gutter.

The deflection field is formed by at least two spaced apart deflection electrodes of different voltages. In some instances, such as the above U.S. Pat. No. 3,373,437, a grounded deflection plate is porous to also serve as the drop catcher to catch deflected ink drops impacting thereon. The high voltage electrode is solid, however, and is designed to repel the charged drops. A control electrode in other types of ink jet printing such as Hertz U.S. Pat. No. 3,673,601 is also porous to catch charged drops which are diverted from the normal path of uncharged drops. The field is established between the ink and the control electrode and no sets of electrodes are provided to form a deflection field. Only one ink jet is employed and misting is not a substantial problem. A two row ink jet system is shown in Mathis U.S. Pat. No. 3,701,998 employing a high voltage center deflection electrode and two separate grounded electrodes for establishing the deflection fields and also serving to intercept the deflected ink drops. All of the deflection electrodes are solid and not porous, however.

When a large number of closely spaced ink jets are employed for recording, a significant amount of mist is generated in the vicinity of the recording medium. A substantial portion of the mist tends to collect on the deflection plates with the result that ink accumulates rapidly on a center deflection plate between two rows of ink jets. It is desirable to minimize the distance between the two adjacent rows of ink jets so as to simplify the data manipulation requirement for compensating for the time required for the relative movement of one row of jets to the position on the recording medium previously encountered by the other rows of jets. Hence, it has been extremely difficult to clean the center deflection plate.

SUMMARY OF THE INVENTION

It is therefore an object of the present invention to provide a high voltage deflection electrode to be interposed between two rows of ink jet streams which will not accumulate ink mist thereon.

In accordance with the present invention, high voltage deflection apparatus for ink jet is provided including a pair of electrically conductive planar fine screens supported in a parallel separate relationship. Vacuum means is provided to establish a vacuum in the space between the two screens to draw off mist in proximity to the screens to prevent mist accumulation on the electrode. The deflection apparatus may be positioned between two parallel rows of ink jet stream paths emanating from two separate rows of ink jet orifices. Two corresponding rows of charging electrodes are positioned to selectively charge drops of electrically conductive fluid upon breakoff from filaments of fluid from the orifices. Outer deflection electrodes are positioned on the opposite side of each row of stream paths from the deflection apparatus and held at a different voltage therefrom to establish an electrostatic deflection field for deflecting the charged drops from the path of uncharged drops.

The foregoing and other objects, features and advantages of the invention will be apparent from the following more particular description of a preferred embodiment of the invention as illustrated in the accompanying drawings.

DESCRIPTION OF A PREFERRED EMBODIMENT

Figure 1:
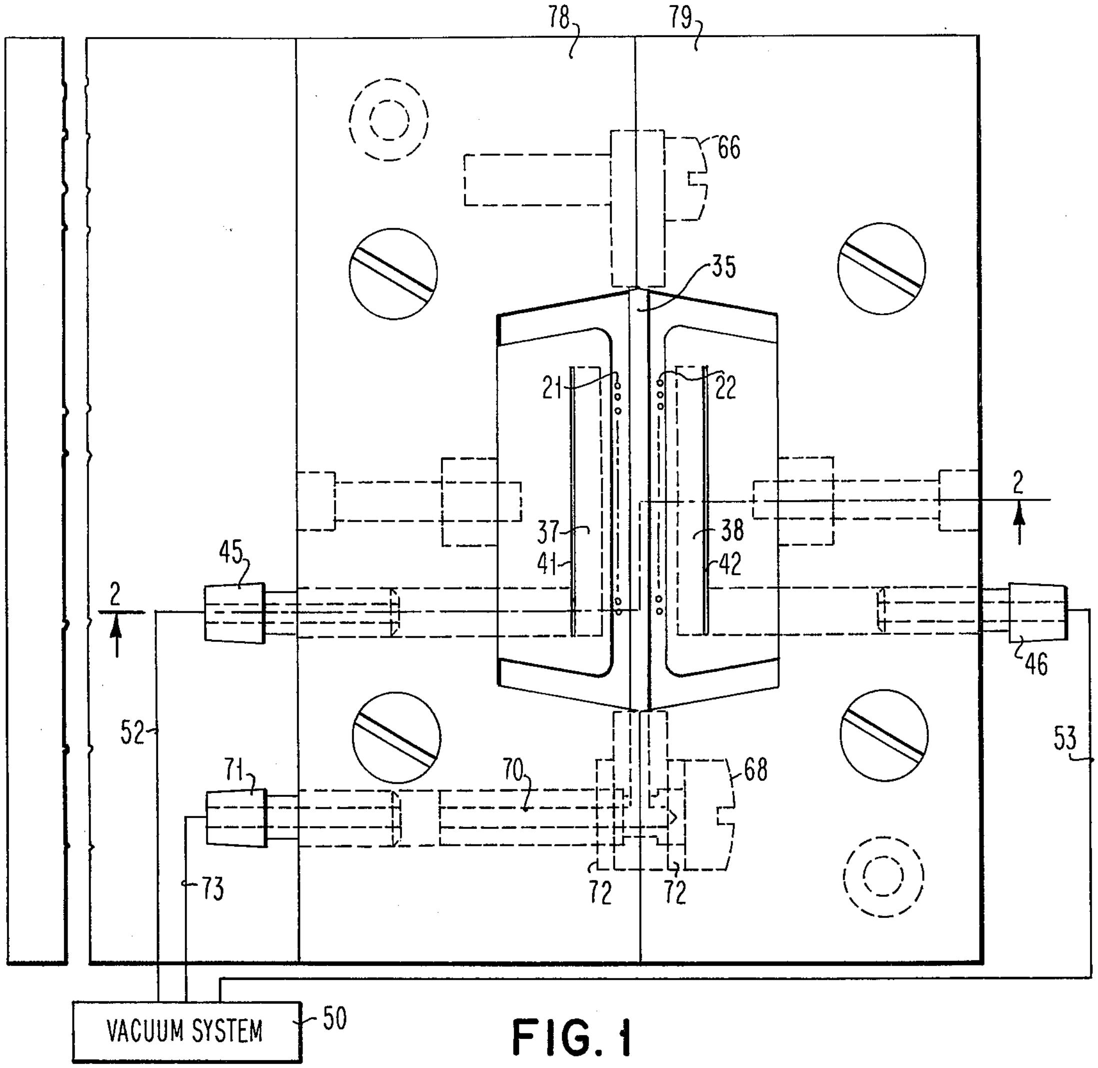
FIG. 1 is a frontal and partially schematic view of an ink jet head including deflection electrode apparatus constructed in accordance with the present invention.
Figure 2:
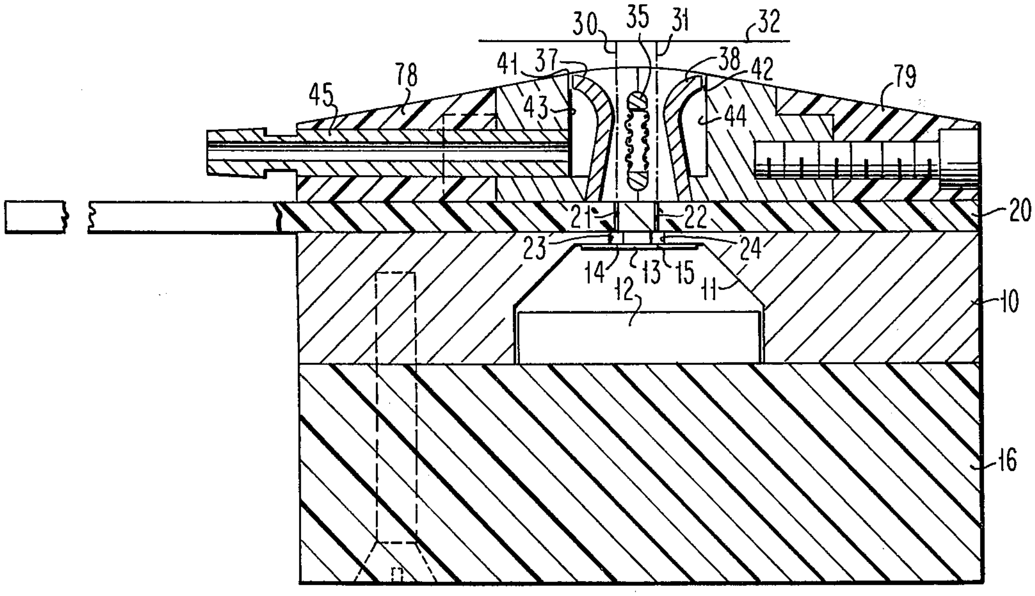
FIG. 2 is a cross section view through the ink jet head of FIG. 1.

Referring to FIGS. 1 and 2, an ink jet head assembly is shown including the block 10 having a manifold 11 formed therein. Mounted within the manifold are a piezoelectric crystal 12 and an orifice plate 13. The orifice plate includes two rows 14 and 15 of closely spaced ink jet orifices. A charge plate 20 is mounted on block 10 and is provided with two rows of charge electrodes 21 and 22, each charge electrode aligned with a corresponding orifice of orifice plate 13. The piezoelectric crystal 12 is mounted on a backing plate 16.

Pressurized ink is supplied to manifold 11 and is ejected through orifices 14 and 15 of orifice plate 13. Piezoelectric crystal 12 is perturbated by an electrical signal to vary the internal volume of manifold 11. This perturbates the ink pressure, causing the ink jet streams emanating from orifices 14 and 15 to break into streams of uniform drops. The ink emanates from orifices 14 and 15 in the form of filaments passing through openings 23 and 24 with the perturbations increasing as the distance from the orifice plate 13 increases. At a determinable distance from the orifice plate, the drops break off from the filaments. The drops then assume a charge dependent upon the voltage applied to the corresponding charge electrode 21 or 22 at the instant of drop breakoff.

Uncharged drops proceed along paths 30 and 31 to impact a recording medium 32. The high voltage deflection plate 35 is positioned intermediate the drop flow paths 30 and 31. This is the high voltage deflection electrode which is described in further detail hereinafter. Grounded deflection electrodes 37 and 38 are positioned respectively on the opposite sides of drop paths 31 and 32 from high voltage deflection electrode 35. Deflection electrodes 37 and 38 curve away from the drop paths and terminate in openings 41 and 42 which communicate with cavities 43 and 44. The cavities further communicate with tubes 45 and 46 which are connected to a vacuum source 50 by, respectively, lines 52 and 53.

Electrostatic fields established between electrode 35 and electrodes 37 and 38 thus causes charged drops to be deflected to contact respectively electrodes 37 and 38 from normal uncharged drop paths 30 and 31. Electrodes 37 and 38 therefore also serve as gutters to intercept the drops which are deflected and not used for recording purposes. The intercepted drops flow to the ends of the respective electrodes and are drawn through the respective opening 41 or 42 into cavity 43 or 44 by the vacuum source 50. Accumulated ink is drawn from cavity 43 or 44 through the respective tube 45 or 46 to the vacuum source 50. The ink may then be recycled for subsequent recording use.

Figure 3:
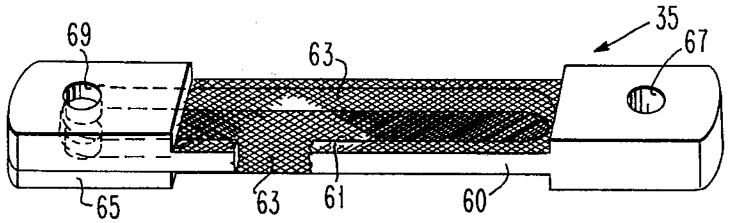
FIG. 3 is a perspective view of the deflection electrode of FIG. 1.
Figure 4:
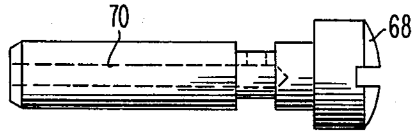
FIG. 4 is a perspective view of a hollowed screw of FIG. 1.

Referring to FIG. 3, electrode 35 may be formed of a solid frame 60 having an opening 61 therein. Each side of the opening is covered by a fine mist screen 63. At one end, the opening 61 is covered on one side by the frame 60 and on the other side by plate 65. With additional reference to FIG. 1, electrode 35 is secured at one end by means of screw 66 extending through hole 67. At the other end, electrode 35 is secured in position by means of specially hollowed out screw 68 extending through hole 69. Hollowed out screw 68 thus contains a passage 70 communicating with the interior of electrode 35 and is sealed from the atmosphere by O-ring seals 72. Passage 70 also communicates with tube 71 which is connected to vacuum source 50 by line 73. Thus, vacuum source 50, acting through line 73, tube 71 and passage 70 in screw 68, creates a vacuum at the interior of frame 60 between fine mist screens 63. This vacuum source draws off ink mist in proximity to screens 63 of electrode 35. Screw 68 and internal passage 70 are illustrated in detail in FIG. 4.

Figure 5:
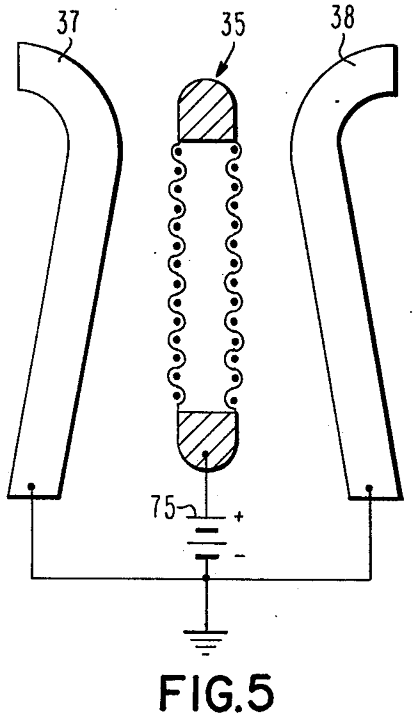
FIG. 5 is a schematic representation of an electrical circuit for the deflection electrodes of FIG. 1.

Referring to FIG. 5, an electrical circuit for causing an electrostatic deflection field to be established between electrode 35 and electrodes 37 and 38 is shown. Electrodes 37 and 38 are connected to a common ground and are connected to one terminal of voltage source 75. The other terminal of voltage source 75 is connected to electrode 35. Electrode 35, including frame 60 and wire screen 63 are electrically conductive, as are electrodes 37 and 38. Thus, a field gradient is established between each of grounded electrodes 37 and 38 and the high voltage of electrode 35. As shown in FIG. 5, voltage source 75 is connected so that electrode 35 is at a high positive voltage. Thus, drops to be deflected are charged positively so as to be repelled by the electrode 35 and attracted to the respective electrode 37 or 38. Alternatively, outward deflection of negatively charged drops may be obtained by reversing the terminals of voltage source 75.

Proper electrical considerations require that high voltage electrode 35 be insulated from the grounded electrodes and support structure by means of insulators. This is accomplished by forming mounting blocks 78 and 79 from an insulating material and by connecting vacuum line 73 to the vacuum system 50 separately from lines 52 and 53 to prevent a short circuit through the conductive ink.

As an example, the rows of ink jet orifices may be spaced apart about 0.100 inch and frame 60 of the high voltage deflection electrode 35 may be approximately 0.04 inches in thickness at the cross section of FIG. 2 with fine screens 63 of approximately 5 micron fineness. Voltage source 75 may for example comprise 2000 volts.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In an ink jet head including means for generating two parallel rows of stream paths of selectively charged drops of conductive fluid and including a source of electric potential, deflection electrode apparatus comprising:
   - support means;
   - a pair of electrically conductive planar fine screens supported by said support means in parallel separate relationship and oriented parallel to and extending between said rows of drop stream paths and electrically connected to said source to establish electrostatic deflection fields for deflecting said charged drops outwardly from said screens; and
   - vacuum means establishing a vacuum in the space between said pair of screens.

2. The apparatus of claim 1 wherein said support means comprises:
   - frame means for supporting said pair of screens in said parallel separate relationship.

3. The apparatus of claim 2 additionally comprising:
   - outer deflection electrode means positioned on the opposite side of each said row of stream paths from said screens.

4. The apparatus of claim 3 wherein:
   - said electric potential source is additionally electrically connected between said screens and said outer deflection electrode means to establish electrostatic deflection fields therebetween for deflecting said charged drops outwardly from said screens.

5. The apparatus of claim 2 wherein said frame means is positioned midway between said stream paths.

6. The apparatus of claim 5 wherein said frame means additionally includes an opening therein for communicating between said vacuum means and said space between said pair of screens.

7. The apparatus of claim 6 wherein said frame means is additionally adapted to seal said space between said pair of screens excepting said opening.

8. In an ink jet head including means for generating two parallel rows of stream paths of selectively charged uniform drops of conductive fluid, deflection electrode apparatus comprising:
   - a pair of electrically conductive planar fine screens;
   - a frame supporting said screens in parallel separate relationship to form a space therebetween and orienting said screens parallel to and midway between said rows of drop stream paths;
   - a vacuum source communicating with said space between said pair of screens;
   - an outer deflection electrode positioned on the opposite side of each said row of stream paths from said screens; and
   - an electric potential source connected between said screens and said outer deflection electrodes to establish electrostatic deflection fields therebetween for deflecting charged drops outwardly from said screens.

9. The apparatus of claim 8 wherein:

said frame additionally includes an opening extending from said space between said pair of screens and is additionally adapted to seal said space between said pairs of screens excepting said opening; and additionally including a mounting element for supporting said frame and adapted for communicating between said vacuum source and said opening in said frame.

* * * * *